Patented Aug. 30, 1938

2,128,879

UNITED STATES PATENT OFFICE 2,128,879

RESINOUS IMPREGNATING MATERIAL

Kenneth M. Irey and Lawrence M. Debing, Palisades Park, N. J., assignors to Resinox Corporation, New York, N. Y., a corporation of Delaware No Drawing. Application November 14, 1935, Serial No. 49,733

7 Claims. (Cl. 106—22)

Our invention relates to the production of resinous impregnating materials. More specifically, our invention relates to the production of an improved impregnating material having a resinous base formed by the condensation of aldehydes with bis-[hydroxy aryl] di-alkyl methanes and/or their ketone condensation products.

Numerous impregnating agents having phenolic resin bases have been recommended in the past but these have in most cases been prepared by the reaction of aldehydes with free phenols or materials containing free phenols. Such products are, therefore, disadvantageous for many purposes, especially for impregnating objects which come in contact with foodstuffs.

One object of our invention, therefore, is the preparation of a resinous impregnating material having as a base a condensation product of substances containing no free phenols. A further object of our invention is the preparation of an impregnating material which, upon application and heat treatment, will have satisfactory bonding properties, flexibility, toughness, and water resistance. Further objects and advantages of our invention will be apparent from the following description.

The impregnating agents of our invention comprise suspensions, in relatively non-volatile solvents, or plasticizers, of heat reactive condensation products of aldehydes with bis-[hydroxy-aryl]-di-alkyl methanes, or mixtures of such substituted methanes with their ketone condensation products. We prefer to employ such a mixture, as for example, a mixture of beta.beta-bis-[4-hydroxy-phenyl]-propane and beta.beta-bis-[4-hydroxy-phenyl]-propane—acetone condensation product. Mixed reaction products of this type may be formed by the interaction of hydroxy-aryl compounds and ketones. Bis-[hydroxy-aryl]-di-alkyl methane constitutes the primary crystalline reaction product of 2 mols of the corresponding hydroxy-aryl compound with 1 mol. of a ketone. Bis-[hydroxy-aryl]-di-alkyl methane—ketone condensation product represents the further reaction of the primary crystalline product with additional ketone. These products may be prepared separately and subsequently mixed as described below, or a mixture of the materials may suitably be prepared in a single reaction from the corresponding hydroxy-aryl compounds and ketones, in accordance with the process described in co-pending application Serial No. 680,230 by K. M. Irey and L. C. Swallen. The method of preparing the compounds separately and subsequently mixing is described in the example below with reference to the preferred material, i. e., a mixture of beta.beta-bis-[4-hydroxy-phenyl]-propane and beta.beta-bis-[4-hydroxy-phenyl]-propane—acetone condensation product.

Beta.beta-bis-[4-hydroxy-phenyl]-propane is a white crystalline material with a melting point of 150 to 154° C. This material may be prepared by any of the known methods, as for example, by the method described by W. A. Beatty in U. S. Patent No. 1,225,748, granted March 15, 1917.

Beta.beta-bis-[4-hydroxy-phenyl]-propane—acetone condensation product may be prepared by reacting approximately equal molecular proportions of acetone and the crystalline product described above, in the presence of an acid catalyst such as hydrochloric acid, at temperatures of 70 to 80° C. This material may also be prepared by any other suitable procedure as, for example, that disclosed in co-pending application U. S. Serial No. 680,230 referred to above. The beta.beta-bis-[4-hydroxy-phenyl]-propane—acetone condensation product prepared by any of these procedures is a reddish colored resinous material having a melting point around 50° C.

The mixed intermediate which we prefer to utilize in the present process constitutes a mixture of approximately equal proportions of the beta.beta-bis-[4-hydroxy-phenyl]-propane and the beta.beta-bis-[4-hydroxy-phenyl]-propane—acetone condensation product. This intermediate may be prepared by simply mixing the materials prepared as above described, or, as has been previously pointed out, this intermediate may be formed in a single reaction from the corresponding hydroxy-aryl compound and ketone. The proportions of the two ingredients of the mixed intermediate may be varied within rather wide limits and, in fact, either one of the materials may be used separately. However, in general we prefer to utilize a mixture of approximately the proportions described above.

The second step of the process for preparing our improved impregnating materials constitutes the reaction of the mixed intermediate product described above with an aldehyde such as formaldehyde or one of its polymers. This reaction is carried to a definite stage as indicated by the "dry rubber" test, after which the product is immediately mixed with a high boiling solvent, or plasticizer, to yield the final impregnating material. The "dry rubber" test utilized in this connection measures the degree of heat reactivity of the resinous product in terms of the time required to eliminate tackiness in a sample placed on a hot plate maintained at 150° C. The results of this test, as given in the example below, refer to time in seconds for a sample of the product to lose its tackiness on the hot plate.

The aldehyde reaction proceeds at an extremely slow rate in the absence of a catalyst and we therefore prefer to utilize an alkaline condensation catalyst for this reaction. Materials such as barium hydroxide, which are often employed as condensation catalysts, give rise to a marked acceleration of the reaction but nevertheless require a considerable period of time to carry the reaction to the preferred stage for the present process. We have found that lime exerts a more pronounced accelerating effect and that a mixture of lime and barium hydroxide constitutes an eminently satisfactory catalyst for this purpose. Utilizing a catalyst comprising four parts of barium hydroxide and one part of lime, this reaction may generally be carried to the desired stage in a period of about 30 minutes. Although we prefer to employ a mixture of this nature, it may be said that any alkaline earth catalyst will be operative in our process.

The condensation reaction may be illustrated by the following specific example: 100 parts of the mixed intermediate product described above are placed in a resin kettle, melted and then cooled to approximately 60° C. The mass is then thoroughly mixed with 70 parts of a 40% formaldehyde solution after which 4 parts of barium hydroxide and one part of lime are added in the form of an aqueous suspension. The resulting mixture is then reacted under heat until a sample exhibits a dry rubber test of approximately 15 to 25 seconds. When this point is reached, the application of heat is immediately stopped and the plasticizer, e. g., di-ethylene glycol, is added as quickly as possible. The amount to be added will depend upon the desired plasticity of the impregnating material, but for most purposes should be just sufficient to bring the material to the state of a thin liquid having a dry rubber test of approximately 40 seconds.

The dry rubber value of the material may be varied within rather wide limits, e. g., 15 sec. to 90 sec., depending on the desired degree of heat reactivity of the product. For some purposes it is preferred to carry the reaction at this stage as far as possible without transforming the product to the insoluble or rubbery stage. The dry rubber test of 15 to 25 seconds represents a safe practical limit, but the reaction may, of course, be carried further if precautions are taken to cool the material by adding the plasticizer before the insoluble stage is reached.

The plasticizer apparently acts only in a physical manner as a solvent or plasticizing agent and does not enter into reaction with the resinous mass. The increased time value of the dry rubber test, after addition of the plasticizing agent does not indicate a change in the nature of the resin but merely a physical effect of the presence of the plasticizer. It will be apparent, therefore, that any other organic solvent or placticizer for the particular resin produced may be successfully employed. Any such material, however, should preferably be sufficiently non-volatile to exert a plasticizing effect in the final mass of impregnating material after application and heating, and should, of course, be chemically inactive towards the resinous mass and the materials to be impregnated.

The impregnating agents prepared as above described may be employed for any of the purposes for which previously known materials of this general type have been used, e. g., as adhesives, coating materials, etc. The usual methods of application may be employed and the usual methods of heating may be used to transform the impregnating material to the insoluble stage. For example, various fibrous materials may be coated with the impregnating agent by dipping, brushing, spraying and the like, and may subsequently be baked in an oven until the resinous coating or bond reaches the desired stage of insolubility and toughness. Various other uses, such as the application of an "enamel" coating to wire, will also be apparent to those skilled in the art. The desirable properties of our impregnating material will best be taken advantage of, however, in the impregnation of materials which come in contact with foodstuffs. In such uses the desirable properties of our impregnating agents, such as water impermeability and freedom from taste and odor are highly advantageous.

It is to be understood, of course, that our invention is not to be limited to the particular examples given above by way of illustration. Equivalent reactants and varying proportions or reaction conditions may be employed depending upon the exact nature of the product desired. For example, instead of employing beta.beta-bis-[4-hydroxy-phenyl]-propane and its acetone condensation product, any of the homologues of these materials could be employed. Also, in place of formaldehyde, its polymers such as paraformaldehyde or hexamethylene-tetramine, or its homologues such as acetaldehyde could be utilized. Likewise, any suitable high boiling solvent or plasticizer, such as glycerine, which is compatible with the resinous reaction product and the water contained in such product, and which is chemically inactive at the temperatures employed, could suitably be substituted for the diethylene glycol specified in the example. In general it may be stated that any equivalents or modifications of procedure which would naturally occur to one skilled in the art are included within the scope of our invention.

Our invention now having been described what we claim is:

1. In a process for the production of a resinous material by heat reacting a mixture of a bis-[hydroxy-aryl]-di-alkyl methane and a bis-[hydroxy-aryl]-di-alkyl methane—ketone condensation product with a sufficient proportion of an aldehyde to form an insoluble infusible product when fully reacted, the improvement which comprises carrying the reaction to an advanced stage evidenced by a dry rubber test of 15 to 25 seconds, and then immediately preventing substantial further reaction by ceasing the application of heat and introducing a plasticizer compatible with the condensation product thus produced.

2. In a process for the production of a resinous material by heat reacting a mixture of beta.-beta-bis-[4-hydroxy-phenyl]-propane and beta.-beta-bis-[4-hydroxy-phenyl]-propane—acetone condensation product with a sufficient proportion of formaldehyde to form an insoluble infusible product when fully reacted, the improvement which comprises carrying the reaction to an advanced stage evidenced by a dry rubber test of 15 to 25 seconds, and then immediately preventing substantial further reaction by ceasing the application of heat and introducing a plasticizer compatible with the condensation product thus produced.

3. In a process for the production of a resinous material by heat reacting a mixture of beta.beta-bis-[4-hydroxy-phenyl]-propane and beta.beta-bis-[4-hydroxy-phenyl]-propane—acetone condensation product with a sufficient proportion of formaldehyde to form an insoluble infusible product when fully reacted, the improvements which comprise effecting the reaction in the presence of an alkaline earth catalyst containing lime, carrying the reaction to an advanced stage evidenced by a dry rubber test of 15 to 25 seconds, and then immediately preventing substantial further reaction by ceasing the application of heat and introducing a plasticizer compatible with the condensation product thus produced.

4. In a process for the production of a resinous material by heat reacting a mixture of beta.-beta-bis-[4-hydroxy-phenyl]-propane and beta.-beta-bis-[4-hydroxy-phenyl]-propane — acetone condensation product with a sufficient proportion of formaldehyde to form an insoluble infusible product when fully reacted, the improvements which comprise effecting the reaction in the presence of a catalyst consisting of four parts of barium hydroxide and one part of lime, carrying the reaction to an advanced stage evidenced by a dry rubber test of 15 to 25 seconds, and then immediately preventing substantial further reaction by ceasing the application of heat and introducing diethylene glycol into the condensation product thus produced in an amount sufficient to increase the dry rubber test of the final product to approximately 40 seconds.

5. The product of the process of claim 1.

6. The product of the process of claim 2.

7. The product of the process of claim 2 characterized by a degree of reactivity evidenced by a dry rubber test of approximately 40 seconds.

KENNETH M. IREY.
LAWRENCE M. DEBING.